United States Patent
Huang et al.

(10) Patent No.: US 11,849,426 B2
(45) Date of Patent: Dec. 19, 2023

(54) SYSTEMS AND METHODS FOR SHARING A RESOURCE POOL IN SIDELINK COMMUNICATIONS

(71) Applicant: ZTE CORPORATION, Guangdong (CN)

(72) Inventors: Ying Huang, Guangdong (CN); Lin Chen, Guangdong (CN)

(73) Assignee: ZTE CORPORATION, Guangdong (CN)

(*) Notice: Subject to any disclaimer, the term of this patent is extended or adjusted under 35 U.S.C. 154(b) by 0 days.

(21) Appl. No.: 16/784,063

(22) Filed: Feb. 6, 2020

(65) Prior Publication Data
US 2020/0178217 A1   Jun. 4, 2020

Related U.S. Application Data

(63) Continuation of application No. PCT/CN2017/097250, filed on Aug. 11, 2017.

(51) Int. Cl.
*H04W 72/02* (2009.01)
*H04W 4/40* (2018.01)
(Continued)

(52) U.S. Cl.
CPC ............. *H04W 72/02* (2013.01); *H04W 4/40* (2018.02); *H04W 24/10* (2013.01);
(Continued)

(58) Field of Classification Search
CPC ....... H04W 72/02; H04W 4/40; H04W 76/27; H04W 24/10; H04W 72/1257; H04W 80/02; H04W 92/18
See application file for complete search history.

(56) References Cited

U.S. PATENT DOCUMENTS

2016/0242152 A1   8/2016   Yu et al.
2016/0353397 A1*  12/2016  Jung .................... H04W 8/005
(Continued)

FOREIGN PATENT DOCUMENTS

| CN | 104410975 A | 3/2015 |
| CN | 105338548 A | 2/2016 |
| WO | 2016089185 A1 | 6/2016 |

OTHER PUBLICATIONS

3GPP TSG RAN WG1 Meeting #89, R1-1707303 Hangzhou, P.R. China May 15-19, 2017 Source: Intel Corporation Title: Sharing resourcce pool for eNB-controlled and UE-autonomous V2V transmission modes (Year: 2017).*
(Continued)

*Primary Examiner* — Chi H Pham
*Assistant Examiner* — Weibin Huang
(74) *Attorney, Agent, or Firm* — Duane Morris LLP

(57) ABSTRACT

Systems and methods for sharing a resource pool in wireless sidelink communications are disclosed herein. In one embodiment, a method performed by a first node is disclosed. The method comprises: sensing on a resource pool shared by a group of nodes for sidelink communications; and transmitting a report related to the shared resource pool to a second node, wherein the second node is outside the group of nodes and schedules sidelink communication resources for at least one node of the group of nodes based on the report.

12 Claims, 11 Drawing Sheets

(51) Int. Cl.
*H04W 76/27* (2018.01)
*H04W 24/10* (2009.01)
*H04W 72/12* (2023.01)
*H04W 80/02* (2009.01)
*H04W 92/18* (2009.01)

(52) U.S. Cl.
CPC ....... *H04W 72/1257* (2013.01); *H04W 76/27* (2018.02); *H04W 80/02* (2013.01); *H04W 92/18* (2013.01)

(56) References Cited

U.S. PATENT DOCUMENTS

| | | | |
|---|---|---|---|
| 2017/0055204 A1* | 2/2017 | Jung | H04W 48/20 |
| 2017/0188320 A1* | 6/2017 | Xiong | H04W 72/044 |
| 2017/0230938 A1 | 8/2017 | Huang et al. | |
| 2017/0245248 A1 | 8/2017 | Lei et al. | |
| 2017/0317740 A1* | 11/2017 | Basu Mallick | H04W 8/005 |
| 2019/0174530 A1* | 6/2019 | Kim | H04L 1/0025 |
| 2019/0222980 A1* | 7/2019 | Lee | H04W 72/543 |
| 2019/0246385 A1* | 8/2019 | Lin | H04W 72/044 |
| 2019/0357154 A1* | 11/2019 | Zeng | H04W 52/383 |
| 2020/0107297 A1* | 4/2020 | Wang | H04W 72/0446 |
| 2020/0178215 A1* | 6/2020 | Wang | H04L 5/0048 |
| 2020/0383088 A1* | 12/2020 | Min | H04W 72/0453 |
| 2021/0068125 A1* | 3/2021 | Lin | H04W 76/14 |

OTHER PUBLICATIONS

Catt, "Discussion on resource pool sharing between mode 3 and mode 4," 3GPP TSG RAN WG1 Meeting #89, R1-1707450, Hingzhou, China, May 15-19, 2017, 3 pages.

ZTE, "Considerations for shared resouice pool between mode 3 and mode 4," 3GPP TSG RAN WG1 Meeting #89, R1-1707213, Hingzhou, China, May 15-19, 2017, 3 pages.

Ericsson, "Radio resource pool sharing between mode 3 and mode 4 UEs," 3GPP TSG RAN WG1 Meeting #89, R1-1708942, Hingzhou, China, May 15-19, 2017, 4 pages.

Panasonic, "Discussion on resource pool sharing between UEs in mode 3 and UEs in mode 4," 3GPP TSG RAN WG1 Meeting #89, R1-1708081, Hangzhou, China, May 15-19, 2017, 3 pages.

Intel, "Sharing resource pool for eNB-controlled and UE-autonomous V2V transmission modes", 3GPP TSG RAN WG1 Meeting #89, R1-1707303, Hangzhou, P.R. China, May 15-19, 2017, 5 pages.

NTT Docomo, Further details of UE autonomous resource (re)selection for V2V, 3GPP TSG RAN WG1 Meeting #86, R1-167355, Gothenburg, Sweden, Aug. 22-26, 2016, 7 pages.

Intel, "Sensing based collision avoidance schemes for V2V communication", 3GPP TSG RAN WG1 Meeting #84, R1-160432, St. Julian's, Malta, Feb. 15-19, 2016, 8 pages.

Xinwei, "Discussion on resource pool sharing between Mode 3 and Mode 4," 3GPP TSG RAN WG1 Meeting #89, R1-1707106, Hangzhou, China, May 15-19, 2017, 3 pages.

\* cited by examiner

SYSTEMS AND METHODS FOR SHARING A RESOURCE POOL IN SIDELINK COMMUNICATIONS

TECHNICAL FIELD

The disclosure relates generally to wireless communications and, more particularly, to systems and methods for sharing a resource pool in wireless sidelink communications.

BACKGROUND

Proximity based communication technologies such as D2D (Device-to-Device) and V2X (Vehicle-to-Everything) are attracting more and more attention and research. It can be applied to public safety, car networking, field command, social networking, electronic payment, local advertising, game entertainment, network coverage enhancement, etc. A D2D or V2X system may be applied in scenarios with network coverage, with partial network coverage, or without network coverage, allowing direct discovery or direct communication between multiple user equipment (UEs). A direct communication between two UEs is typically referred to as a sidelink (SL) communication.

A car network refers to a large-scale network of wireless communication and information exchange between car and X, where X can be car, road, pedestrian, Internet, etc., according to an agreed communication protocol and data exchange standard. The car network communication can make a vehicle obtain driving safety, improve traffic efficiency, and obtain convenience or entertainment information. Car network communication can be divided into several modes: Vehicle-to-Vehicle (V2V) communications, Vehicle-to-Pedestrian (V2P) communications, Vehicle-to-Infrastructure (V2I) communications, Vehicle-to-Network (V2N) communications, where the above-mentioned car network communication modes can be collectively referred to as Vehicle-to-Everything (V2X) communications.

In the V2X communication study based on LTE (Long Term Evolution) organized by 3GPP (3rd Generation Partnership Project), V2X communication based on sidelink between UEs is one way to realize the V2X standard. That is, business data is not forwarded through the base station and the core network, but directly sent from the source UE through the air interface to the target UE. This V2X communication is referred to as sidelink-based V2X communication.

V2X sidelink communication includes two transmission modes: mode 3 based on base station scheduling resources, and mode 4 based on UE competing for resources. Under mode 3, a UE transmits control information and data at designated resources according to the scheduling of the base station. Under mode 4, the UE self-selects resources to transmit the control information and data based on resource monitoring of the transmission resource pool.

In existing V2X systems, the transmission resource pools configured by the base station for the two transmission modes (mode 3 and mode 4) are independent of each other. This makes the system prone to congestion and waste of resources, resulting in low efficiency of resource use. To improve the efficiency of resource utilization for sidelink communication, the system can enable the transmission resource pools of mode 3 UE and mode 4 UE not to be independent of each other, and use the same resource pool for UEs using mode 3 and UEs using mode 4. But the base station cannot know the resource information autonomously selected by the mode 4 UE in the shared resource pool, which will cause the resource scheduled by the base station for mode 3 UE to conflict with the resource selected by mode 4 UE. A similar problem exists in resource allocation for mode 1 UE and mode 2 UE in a D2D system. There is no satisfactory solution for the above mentioned problems in existing literatures or existing technologies.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first node is disclosed. The method comprises: sensing on a resource pool shared by a group of nodes for sidelink communications; and transmitting a report related to the shared resource pool to a second node, wherein the second node is outside the group of nodes and schedules sidelink communication resources for at least one node of the group of nodes based on the report.

In a further embodiment, a method performed by a first node is disclosed. The method comprises: receiving a report related to a shared resource pool from a second node, wherein the shared resource pool is shared by a group of nodes for sidelink communications and the first node is outside the group of nodes; and scheduling sidelink communication resources for at least one node of the group of nodes based on the report.

In a different embodiment, a communication node configured to carry out a disclosed method in some embodiment is disclosed.

In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

To improve radio resource utilization efficiency and reliability in sidelink communication, the present teaching discloses methods and systems for sharing a transmission resource pool among UEs of different transmission modes, e.g. mode 3 UE and mode 4 UE in a V2X system. The disclosed methods can also be applied in a D2D system, where mode 3 UE is replaced by mode 1 UE that is also using a BS-scheduled sidelink resource allocation scheme; and mode 4 UE is replaced by mode 2 UE that is also using a UE autonomous resource selection scheme. For purposes of simplicity and illustration, the description of the present teaching will focus on a V2X system including mode 3 UEs and mode 4 UEs for sidelink communication resource allocation. It can be understood that the systems and methods disclosed in the present teaching may similarly be applied in a D2D system including mode 1 UEs and mode 2 UEs for sidelink communication resource allocation.

Figure 1:
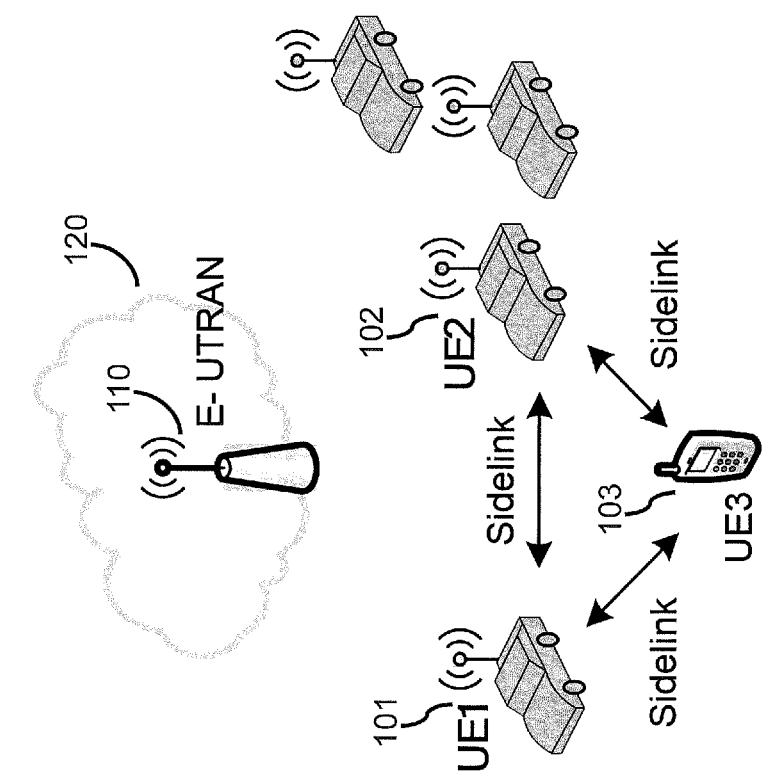
FIG. 1 illustrates an exemplary V2X communication network in which techniques disclosed herein may be implemented, in accordance with an embodiment of the present disclosure.

FIG. 1 illustrates an exemplary V2X communication network 100 in which techniques disclosed herein may be implemented, in accordance with an embodiment of the present disclosure. As shown in FIG. 1, multiple UEs 101, 102, 103 in the V2X communication network 100 can communicate through sidelinks connecting each pair of the UEs. That is, business data is not forwarded through the base station (BS) 110 or the core network 120, but directly sent from a source UE through the air interface to a target UE. This V2X communication is referred to as sidelink-based V2X communication.

While a mode 4 UE can broadcast sidelink control information (SCI) to all other UEs to indicate resource selection of the mode 4 UE through the sidelinks, the BS 110 does not receive the SCI from the mode 4 UE. As such, the BS 110 does not automatically know the resource reservation status on a shared resource pool for sidelink communications, without receiving any report about the resource reservation from the UEs.

According to various embodiments of the present teaching, the BS may receive a report related to the transmission resource pool shared by a group of UEs, either from a UE (mode 3 or mode 4) that senses the shared transmission resource pool and reports the sensed resource reservation in the shared resource pool, or from each mode 4 UE that reports its own reserved resources in the shared resource pool. The BS can schedule resources for mode 3 UE based on the received report(s) to avoid conflict with any resource selected or reserved by a mode 4 UE.

The methods disclosed in the present teaching can be implemented in a cellular communication network, which includes one or more cells. Each cell may include at least one BS operating at its allocated bandwidth to provide adequate radio coverage to its intended users, e.g. UE devices. In various embodiments, a BS in the present disclosure can include, or be implemented as, a next Generation Node B (gNB), an E-UTRAN Node B (eNB), a Transmission/Reception Point (TRP), an Access Point (AP), etc. A BS and a UE device can communicate with each other via a communication link, e.g., via a downlink radio frame from the BS to the UE or via an uplink radio frame from the UE to the BS. Two UEs can communicate with each other via a sidelink. A BS and a UE may be described herein as non-limiting examples of "communication nodes," or "nodes" generally, which can practice the methods disclosed herein and may be capable of wireless and/or wired communications, in accordance with various embodiments of the present disclosure.

Figure 2:
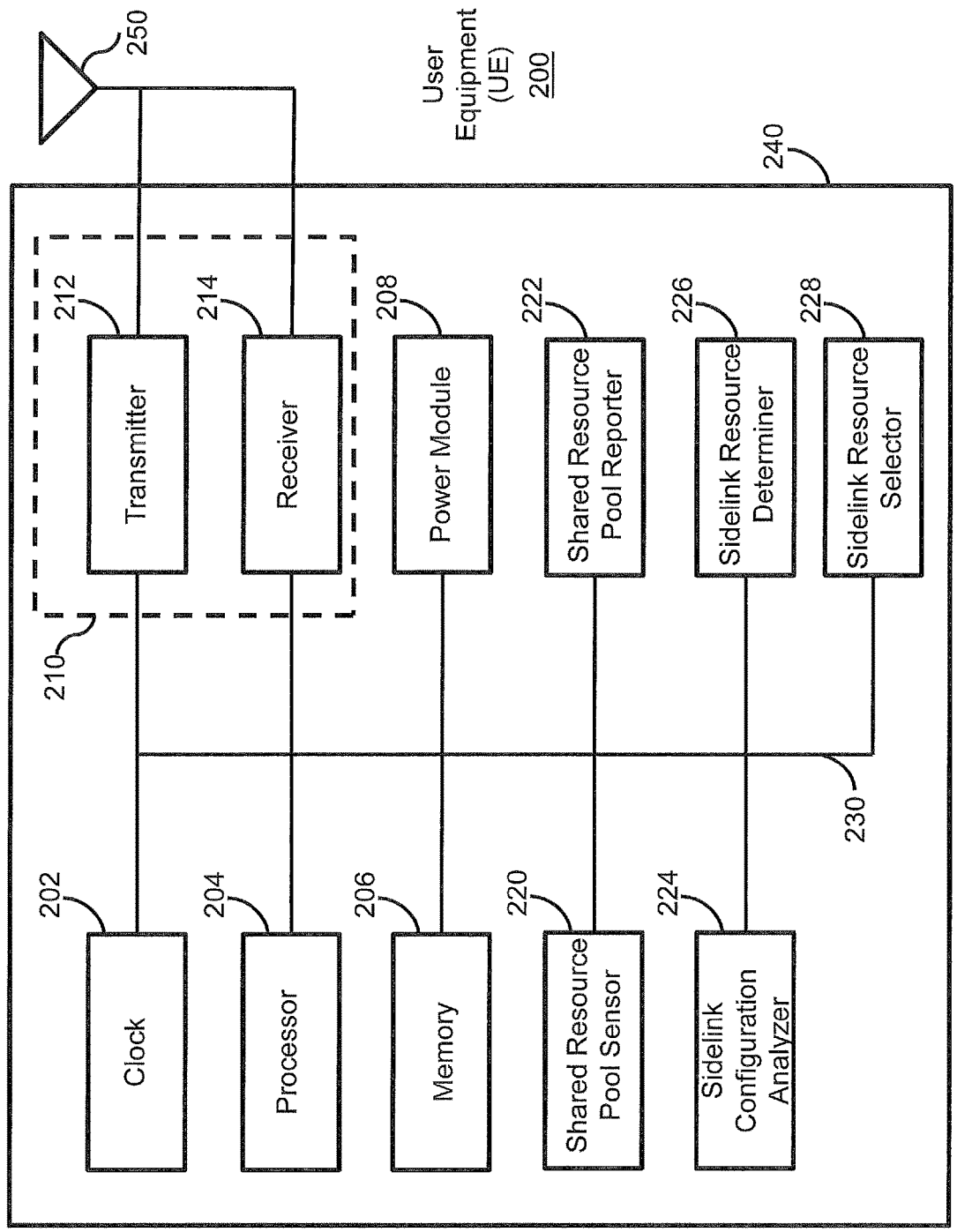
FIG. 2 illustrates a block diagram of a user equipment (UE), in accordance with some embodiments of the present disclosure.

FIG. 2 illustrates a block diagram of a user equipment (UE) 200, in accordance with some embodiments of the present disclosure. The UE 200 is an example of a device that can be configured to implement the various methods described herein. As shown in FIG. 2, the UE 200 includes a housing 240 containing a system clock 202, a processor 204, a memory 206, a transceiver 210 comprising a transmitter 212 and receiver 214, a power module 208, a shared resource pool sensor 220, a shared resource pool reporter 222, a sidelink configuration analyzer 224, a sidelink resource determiner 226, and a sidelink resource selector 228.

In this embodiment, the system clock 202 provides the timing signals to the processor 204 for controlling the timing of all operations of the UE 200. The processor 204 controls the general operation of the UE 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the UE 200 to transmit and receive data to and from a remote device (e.g., the BS or another UE). An antenna 250 is typically attached to the housing 240 and electrically coupled to the transceiver 210. In various embodiments, the UE 200 includes (not shown) multiple transmitters, multiple receivers, multiple transceivers, and/or multiple antennas. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

The sidelink configuration analyzer 224 can receive, via the receiver 214, configuration information about sidelink communications from a BS. The configuration information may be sent by the BS to a group of UEs including the UE 200. The configuration information may include resource pool configuration information and/or report configuration information.

The resource pool configuration information may indicate information about a resource pool used for sidelink communication of the UE 200. For example, the resource pool configuration information may include at least one of: one or more node types that can use the resource pool, whether the resource pool can be used by nodes in radio resource control (RRC) IDLE mode, whether the resource pool can be used by nodes in RRC CONNECTED mode, whether the resource pool can be used by nodes using dynamic scheduling scheme, whether the resource pool can be used by nodes using semi-persistent scheduling (SPS) scheme, whether the resource pool is a shared resource pool, and which release version of nodes can use the resource pool.

The report configuration information may indicate information about a reporting scheme for resource allocation and/or reservation in sidelink communication of the UE 200. For example, the report configuration information may include at least one of: report indication for indicating one or more nodes (or node types) requested or allowed to report information related to the shared resource pool, a report period, time domain information of resources in the shared resource pool that need to be reported, and information type to be included in the report.

The sidelink configuration analyzer 224 may analyze the configuration information received from the BS to determine whether the UE 200 is requested or allowed to report information about a shared resource pool to the BS. If so, the sidelink configuration analyzer 224 may inform the shared resource pool sensor 220 to sense on the shared resource pool and/or inform the shared resource pool reporter 222 to generate a report accordingly.

The shared resource pool sensor 220 may sense on a resource pool shared by a group of UEs for sidelink communications. For example, the shared resource pool sensor 220 can monitor resource availability on the shared resource pool based on SCI received from all other UEs in the group. Based on the sensing, the shared resource pool sensor 220 can know which resource is available (e.g. unoccupied, unselected, or unreserved by any UE), and which resource is unavailable (e.g. occupied, selected, or reserved by some UE) in the shared resource pool. The shared resource pool sensor 220 can send the resource availability information to the shared resource pool reporter 222 for generating a report related to the shared resource pool.

The shared resource pool reporter 222 may receive the resource availability information from the shared resource pool sensor 220 and generate a report related to the shared resource pool based on the resource availability information. In one embodiment, the shared resource pool reporter 222 may generate the report merely based on the resources reserved by the UE 200 (when the UE 200 is a mode 4 UE), depending on the configuration information generated by the BS and received by the sidelink configuration analyzer 224. The shared resource pool reporter 222 may transmit, via the transmitter 212, the report to the BS for sidelink communication resource control.

A V2X system may include both mode 3 UEs each of which performs sidelink communication on resources scheduled by a BS, and mode 4 UEs each of which performs sidelink communication on resources selected by the mode 4 UE itself. In accordance with various embodiments, the UE 200 may serve as either a mode 3 UE or a mode 4 UE in a sidelink communication.

When the UE 200 serves as a mode 3 UE, the sidelink resource determiner 226 may receive, via the receiver 214, scheduling information from the BS. The scheduling information may indicate transmission resources to be used by the UE 200 in sidelink communications and may be generated by the BS based on the report transmitted by the shared resource pool reporter 222. Based on the scheduling information, the sidelink resource determiner 226 can determine which resource to use for future sidelink communications.

When the UE 200 serves as a mode 4 UE, the sidelink resource selector 228 may select communication resources to use in sidelink communications, e.g. based on the resource availability information obtained by the shared resource pool sensor 220. In one embodiment, the sidelink resource selector 228 can inform the shared resource pool sensor 220 and/or the shared resource pool reporter 222 about the selected resource, such that the UE 200 can record and/or report the selected/reserved resource.

In can be understood that, according to various embodiments of the present teaching, the UE 200 may include one or both of the sidelink resource determiner 226 and the sidelink resource selector 228. Whether a UE is a mode 3 UE or mode 4 UE may depend on at least one of: hardware of the UE, software of the UE, a configuration by the BS, and a configuration of the UE.

The power module 208 can include a power source such as one or more batteries, and a power regulator, to provide regulated power to each of the above-described modules in FIG. 2. In some embodiments, if the UE 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the UE 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the sidelink configuration analyzer 224. Conversely, each of the modules illustrated in FIG. 2 can be implemented using a plurality of separate components or elements.

Figure 3:
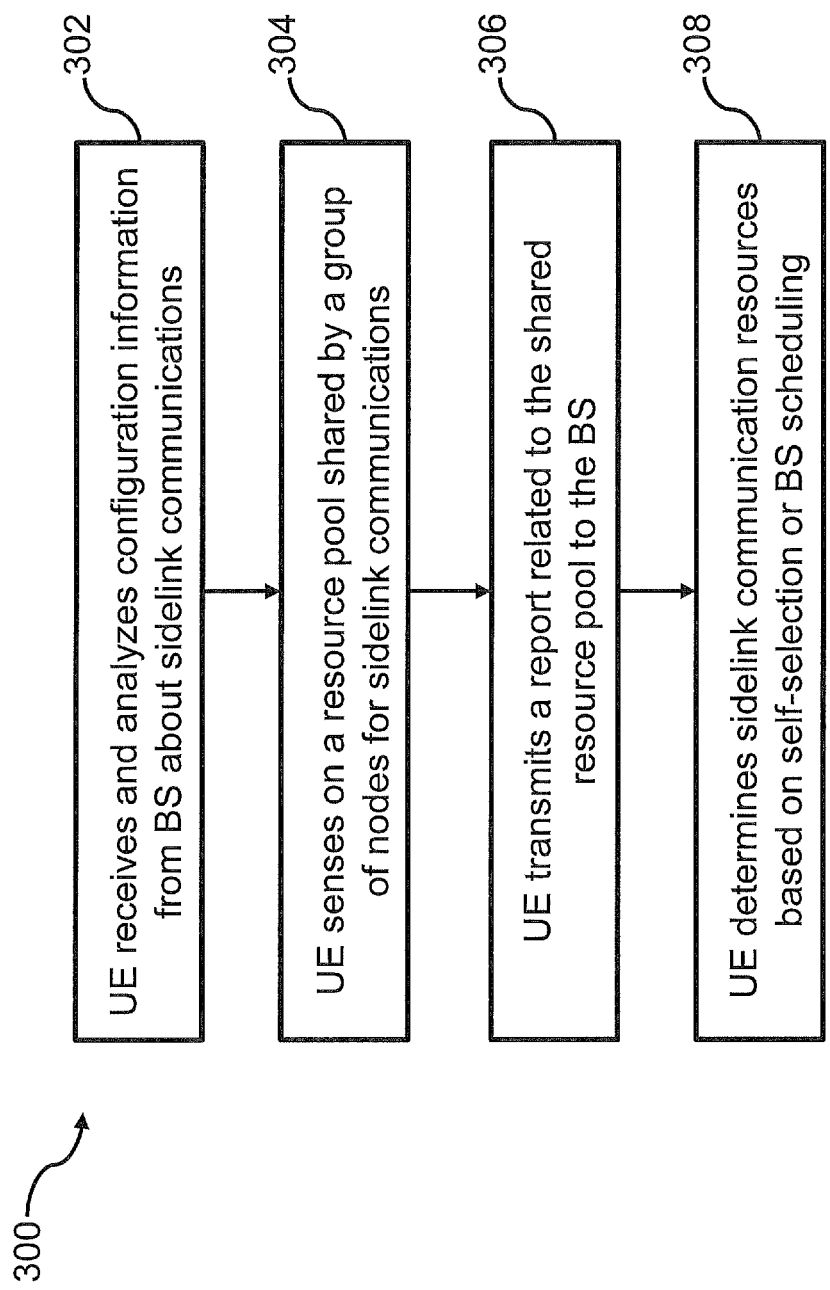
FIG. 3 illustrates a flow chart for a method performed by a UE for sharing a resource pool in wireless sidelink communications, in accordance with some embodiments of the present disclosure.

FIG. 3 illustrates a flow chart for a method 300 performed by a UE, e.g. the UE 200 in FIG. 2, for sharing a resource pool in wireless sidelink communications, in accordance with some embodiments of the present disclosure. At 302, UE receives and analyzes configuration information from BS about sidelink communications. UE senses at 304 on a resource pool shared by a group of nodes for sidelink communications. UE transmits at 306 a report related to the shared resource pool to the BS. As discussed above, the report may be generated by the UE based on the sensing of the shared resource pool. UE determines at 308 sidelink communication resources based on either self-selection or BS scheduling, e.g. depending on whether the UE is a mode 3 UE or a mode 4 UE.

Figure 4:
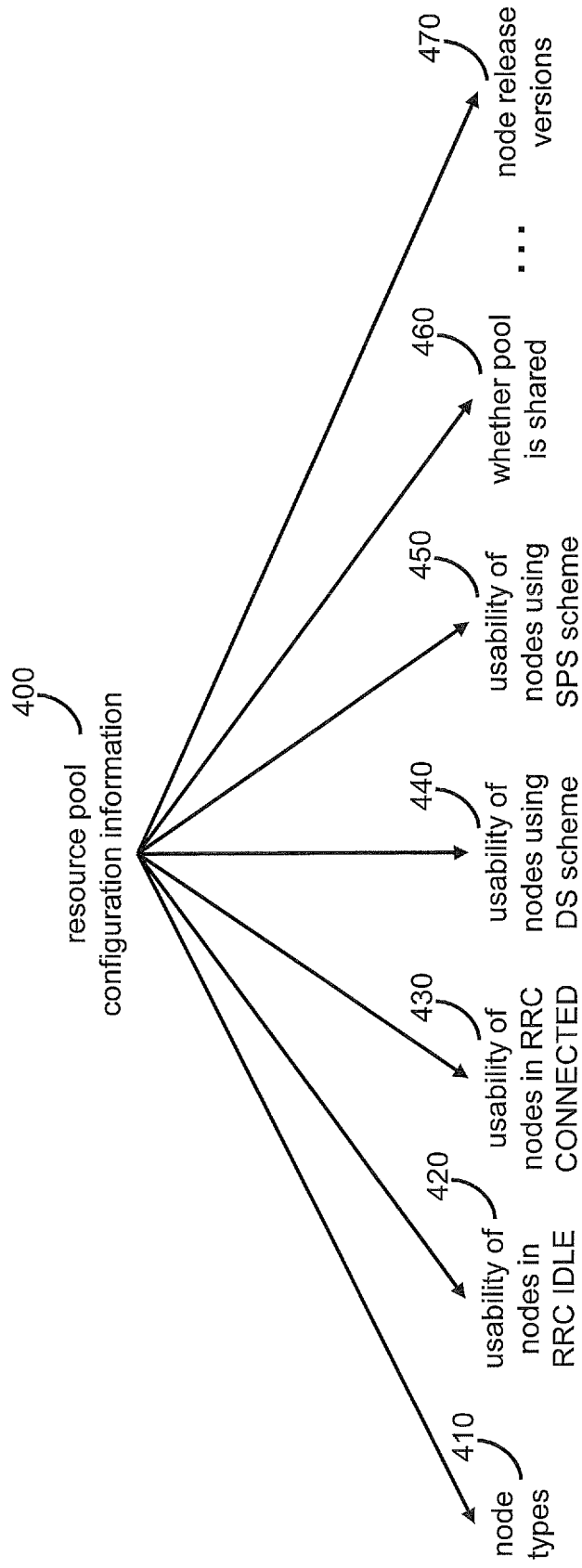
FIG. 4 illustrates exemplary resource pool configuration information generated by a base station (BS), in accordance with some embodiments of the present disclosure.

FIG. 4 illustrates exemplary resource pool configuration information 400 generated by a BS, in accordance with some embodiments of the present disclosure. As shown in FIG. 4, the exemplary resource pool configuration information 400 may include information about: node types 410 that can use the resource pool, usability of nodes in RRC IDLE mode 420, usability of nodes in RRC CONNECTED mode 430, usability of nodes using dynamic scheduling scheme 440, usability of nodes using SPS scheme 450, whether the resource pool is a shared resource pool 460, and release versions of nodes that can use the resource pool 470.

Figure 5:
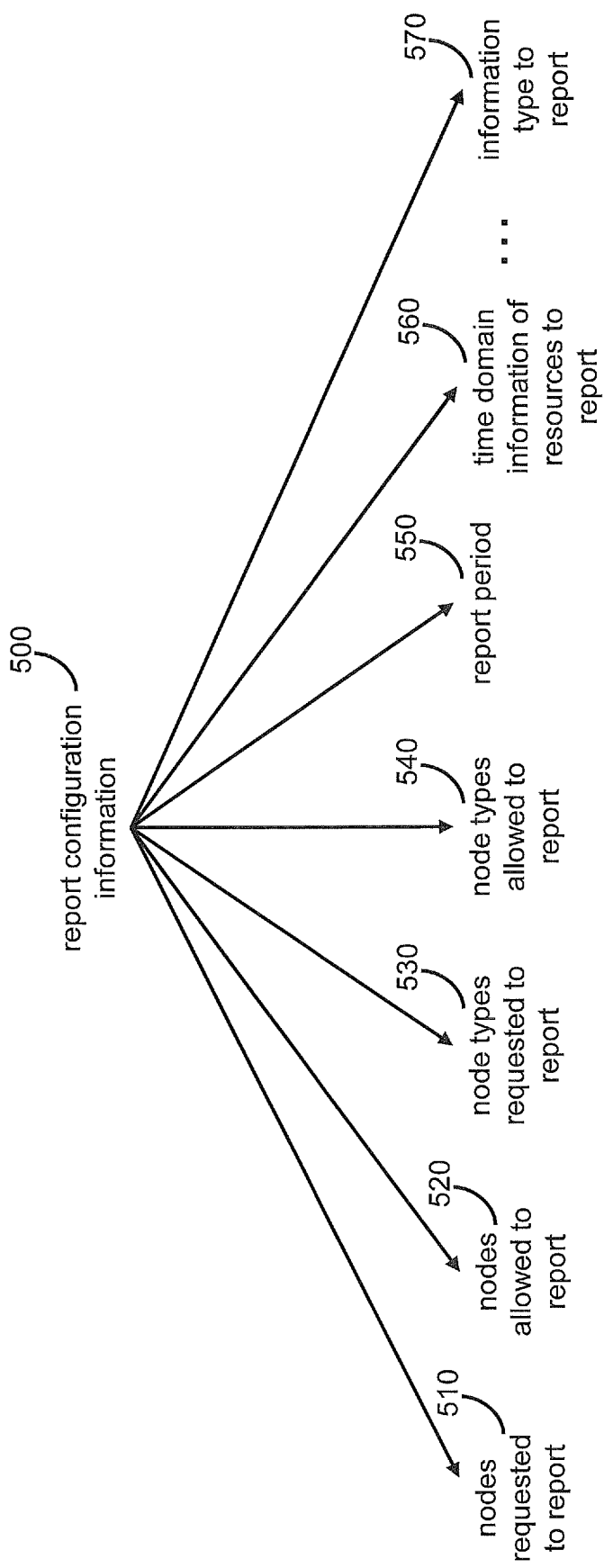
FIG. 5 illustrates exemplary report configuration information generated by a BS, in accordance with some embodiments of the present disclosure.

FIG. 5 illustrates exemplary report configuration information 500 generated by a BS, in accordance with some embodiments of the present disclosure. As shown in FIG. 5, the exemplary report configuration information 500 may include information about: report indication for indicating nodes requested to report 510, nodes allowed to report 520, node types requested to report 530, and node types allowed to report 540 information related to the shared resource pool; a report period 550; time domain information of resources in the shared resource pool that need to be reported 560; and information type to be included in the report 570. The node types 530, 540 may include UEs (mode 3) using eNB scheduling and UEs (mode 4) using UE autonomous resource selection.

Figure 6:
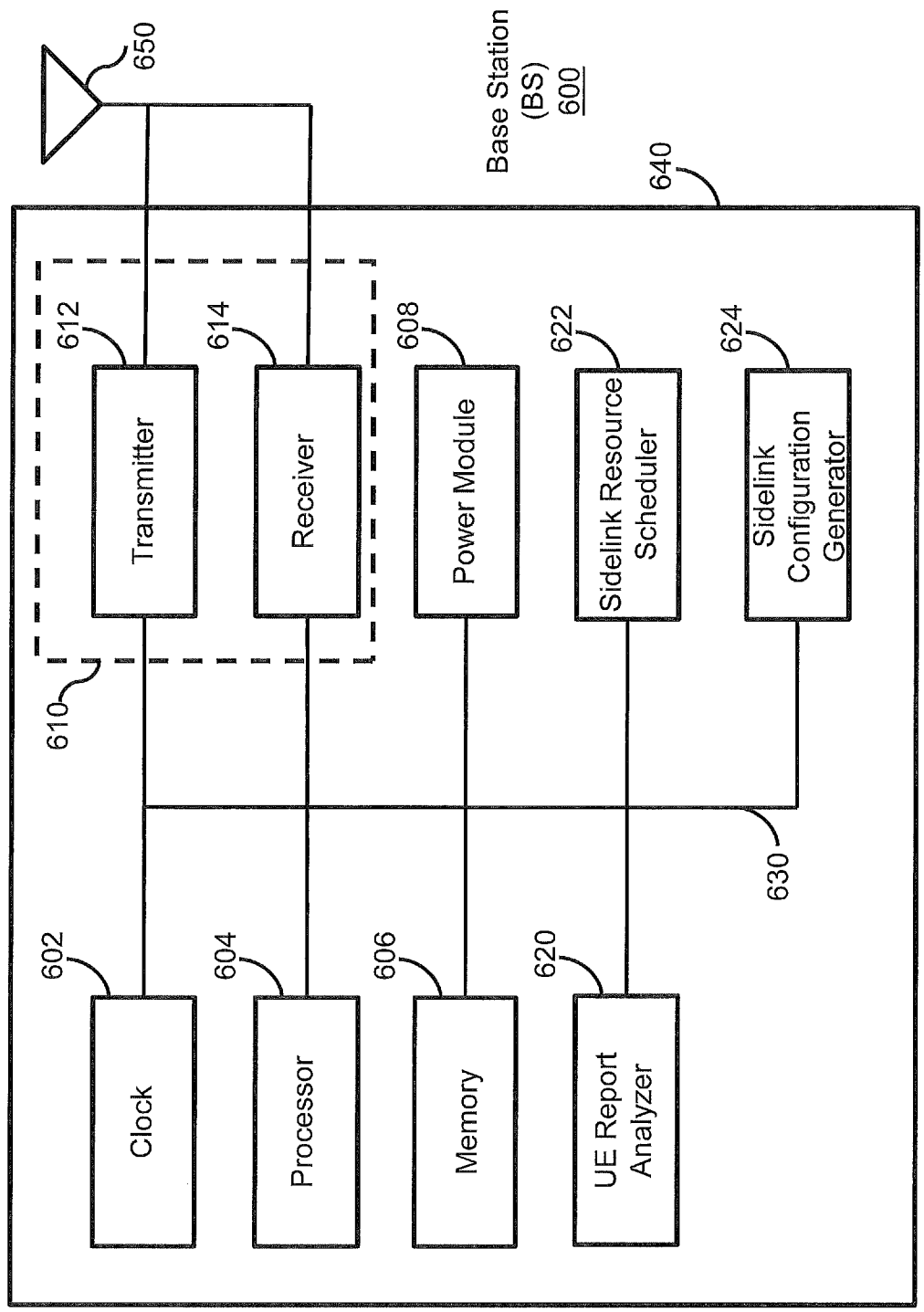
FIG. 6 illustrates a block diagram of a BS, in accordance with some embodiments of the present disclosure.

FIG. 6 illustrates a block diagram of a base station (BS) 600, in accordance with some embodiments of the present disclosure. The BS 600 is an example of a device that can be configured to implement the various methods described herein. As shown in FIG. 6, the BS 600 includes a housing 640 containing a system clock 602, a processor 604, a memory 606, a transceiver 610 comprising a transmitter 612 and a receiver 614, a power module 608, a UE report analyzer 620, a sidelink resource scheduler 622, and a sidelink configuration generator 624. In this embodiment, the system clock 602, the processor 604, the memory 606, the transceiver 610 and the power module 608 work similarly to the system clock 202, the processor 204, the memory 206, the transceiver 210 and the power module 208 in the UE 200. An antenna 650 is typically attached to the housing 640 and electrically coupled to the transceiver 610.

The sidelink configuration generator 624 may generate configuration information about sidelink communications among a group of UEs. As discussed above, the configuration information may include resource pool configuration information as shown in FIG. 4 and/or report configuration information as shown in FIG. 5. The sidelink configuration generator 624 may transmit, via the transmitter 612, the configuration information to the group of UEs. This will enable one or more UEs among the group of UEs to report information about the shared resource pool to the BS 600. In one embodiment, the sidelink configuration generator 624 may generate or update the configuration information based on communication quality of the sidelink communications, interference level of the sidelink communications, locations of the group of the UEs, speed and acceleration of the group of the UEs, etc. The sidelink configuration generator 624 may inform the UE report analyzer 620 about the configuration information such that the UE report analyzer 620 can know which UE is expected to send a report to the UE report analyzer 620.

The UE report analyzer 620 may receive, via the receiver 614, one or more reports about the shared resource pool from the one or more UEs requested to report. The UE report analyzer 620 can analyze the received report to determine resource availability on the shared resource pool. The UE report analyzer 620 may inform the sidelink resource scheduler 622 about the resource availability for the sidelink resource scheduler 622 to schedule sidelink communication resource for one or more mode 3 UEs in the group of UEs.

The sidelink resource scheduler 622 can receive the resource availability or other analyzed report information from the UE report analyzer 620, and schedule sidelink communication resources for at least one of the group of UEs based on the received information from the UE report analyzer 620.

The various modules discussed above are coupled together by a bus system 630. The bus system 630 can include a data bus and, for example, a power bus, a control signal bus, and/or a status signal bus in addition to the data bus. It is understood that the modules of the BS 600 can be operatively coupled to one another using any suitable techniques and mediums.

Although a number of separate modules or components are illustrated in FIG. 6, persons of ordinary skill in the art will understand that one or more of the modules can be combined or commonly implemented. For example, the processor 604 can implement not only the functionality described above with respect to the processor 604, but also implement the functionality described above with respect to the sidelink resource scheduler 622. Conversely, each of the modules illustrated in FIG. 6 can be implemented using a plurality of separate components or elements.

Figure 7:
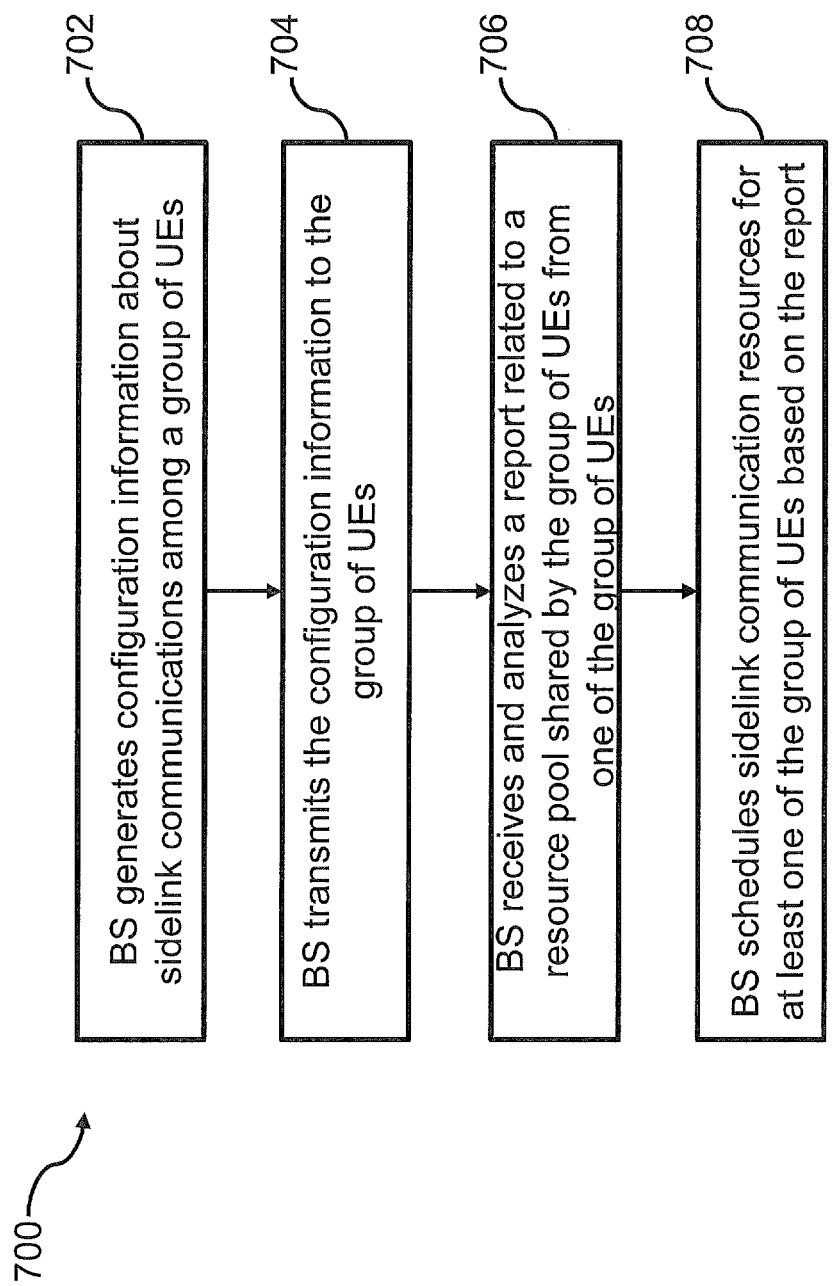
FIG. 7 illustrates a flow chart for a method performed by a BS for sharing a resource pool in wireless sidelink communications, in accordance with some embodiments of the present disclosure.

FIG. 7 illustrates a flow chart for a method 700 performed by a BS, e.g. the BS 600 in FIG. 6, for sharing a resource pool in wireless sidelink communications, in accordance with some embodiments of the present disclosure. At 702, BS generates configuration information about sidelink communications among a group of UEs. BS transmits at 704 the configuration information to the group of UEs. At 706, BS receives and analyzes a report related to a resource pool shared by the group of UEs from one of the group of UEs. BS schedules at 708 sidelink communication resources for at least one (mode 3 UE) of the group of UEs based on the report.

Different embodiments of the present disclosure will now be described in detail hereinafter. It is noted that the features of the embodiments and examples in the present disclosure may be combined with each other in any manner without conflict.

In the following embodiments, mode 3 UEs and mode 4 UEs perform V2X sidelink communication. It can be understood that the following embodiments can also be applied in a D2D network, where mode 3 is replaced by mode 1, which is also a kind of eNB-scheduled sidelink resource allocation scheme, and mode 4 is replaced by mode 2, which is also a kind of UE autonomous resource selection scheme.

The BS eNB sends configuration information to UE. The configuration information includes: resource pool configuration information and/or report configuration information. The configuration information to UE may be transmitted via RRC dedicated signaling or system information. The resource pool configuration information could indicate at least one of: (1) whether the resource pool could be used by UEs using mode 3 and/or UEs using mode 4; (2) whether the resource pool could be used by UEs in RRC IDLE mode and/or UEs in RRC CONNECTED mode; (3) whether the resource pool could be used by UEs using mode 3 dynamic scheduling scheme and/or UEs using mode 3 SPS (semi-persistent scheduling) scheduling scheme; (4) whether the resource pool is a shared resource pool; and (5) the release version of UE which can use the resource pool, i.e. Release 14 UE and/or Release 15 UE.

The report configuration information includes at least one of the following: (1) report indication, which is used to indicate the UE(s) required to report shared resource pool related information, or the UE(s) allowed to report shared resource pool related information; (2) UE type (required or allowed) to report shared resource pool related information, where the UE type includes mode 3 and/or mode 4 UEs; (3) the period for reporting the shared resource pool related information; (4) the information of time resource window which shall be reported by the UE, i.e. the UE needs to report the information of resources in the time resource window, e.g., the information of time resource window includes T1 and/or T2 value; (5) information type which should be reported by the UE, which includes at least one of the following: information about occupied/busy/unavailable resource(s), information about unoccupied/idle/available/candidate resource(s), and information of resource(s) selected/reserved by the reporting UE.

On UE side, a UE sends shared resource pool related information to the eNB. The shared resource pool related information includes at least one of the following: information about occupied/busy/unavailable resource(s), information about unoccupied/idle/available/candidate resource(s), and information of resource(s) selected/reserved by the reporting UE. UE could send the shared resource pool related information to the eNB via RRC dedicated signaling (e.g. UE assistance information, sidelink UE information, and measurement report message) or MAC CE. UE could report the resource pool related information periodically and/or based on a triggering event. Optionally, the UE sends shared resource pool related information to the eNB after the UE receives the configuration information from the eNB.

Figure 8:
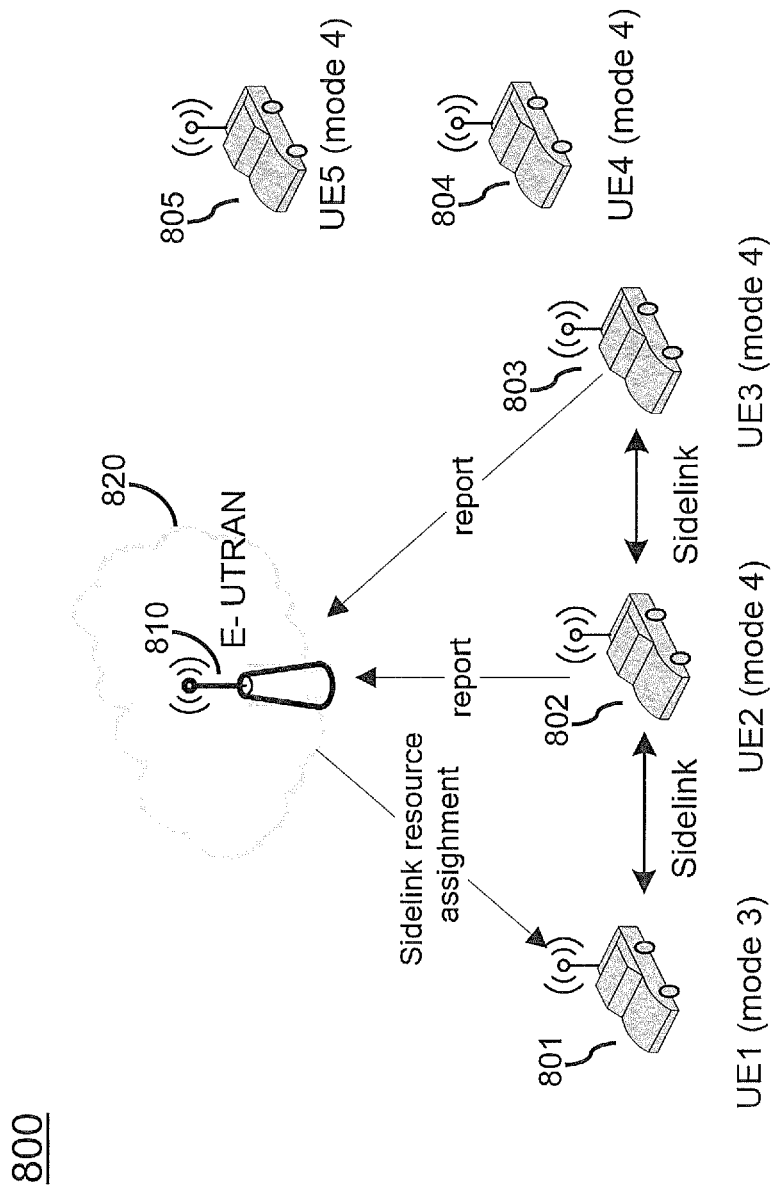
FIG. 8 illustrates an exemplary method for sharing a resource pool in wireless sidelink communications, in accordance with some embodiments of the present disclosure.

In a first embodiment, a mode 4 UE reports the information of resource(s) selected/reserved by the reporting UE. As illustrated in FIG. 8, UE1 801 (mode 3), UE2 802 (mode 4), and UE3 803 (mode 4) are in the proximity of each other and are served by the same eNB 810. The sidelink transmission resource used by UE1 801 is scheduled by the eNB 810, while UE2 and UE3 are using autonomous resource selection scheme to obtain sidelink transmission resource.

In the first embodiment, mode 4 UE reports the shared resource pool related information to the eNB 810. In one example, all mode 4 UEs shall perform sensing on the shared resource pool and reporting. In another example, only the mode 4 UE(s) configured by the eNB 810 shall perform sensing on the shared resource pool and reporting.

In the example illustrated in FIG. 8, only UE2 and UE3 report the shared resource pool related information to the eNB 810. Then the eNB 810 schedules UE1's sidelink communication resource based on the reports received from UE2 and UE3. Although UE4 804 and UE5 805 are also mode 4 UEs, they are located far away from the UE1 801 (mode 3). As such, even if UE4 804 and UE5 805 do not report their resource reservations on the shared resource pool and the eNB 810's scheduling of resources for UE1 801 causes a conflict with the reserved resource of UE4 804 or UE5 805, the communication interference induced by the conflict will be very small. So the eNB 810 may configure merely UE2 and UE3 for reporting, as in the example illustrated in FIG. 8.

The shared resource pool related information in this embodiment includes the information of resource(s) selected/reserved by the reporting UE, which includes the information of resource(s) selected/reserved by the reporting UE for initial transmission and/or retransmission. In detail, the information of resource(s) selected/reserved by the reporting UE may include at least one of the following: frequency indication, priority information, frequency resource location of initial transmission and/or retransmission, time gap between initial transmission and retransmission, modulation and coding scheme, time resource location of initial transmission and/or retransmission information, sub-channel information, RB (resource block) information, reservation period indication, and Activation/Release indication. For example, the value of time resource location of initial transmission and/or retransmission information indicates the timing offset with respect to subframe #0 of SFN #0 in milliseconds. Alternatively, the value of time resource location of initial transmission/retransmission information indicates the timing offset with respect to the subframe in which the UE performed reporting or the eNB received the report from the UE. Optionally, the sub-channel information and/or RB (resource block) information may include at least one of the following: Start RB index, start subchannel index, subchannel number, RB index, subchannel index, a RB bitmap and a subchannel bitmap.

An exemplary triggering event in the first embodiment for sending the report is resource selection/reselection. That is, UE sends the shared resource pool related information after selects or reselects sidelink communication resource in the shared resource pool.

Figure 9:
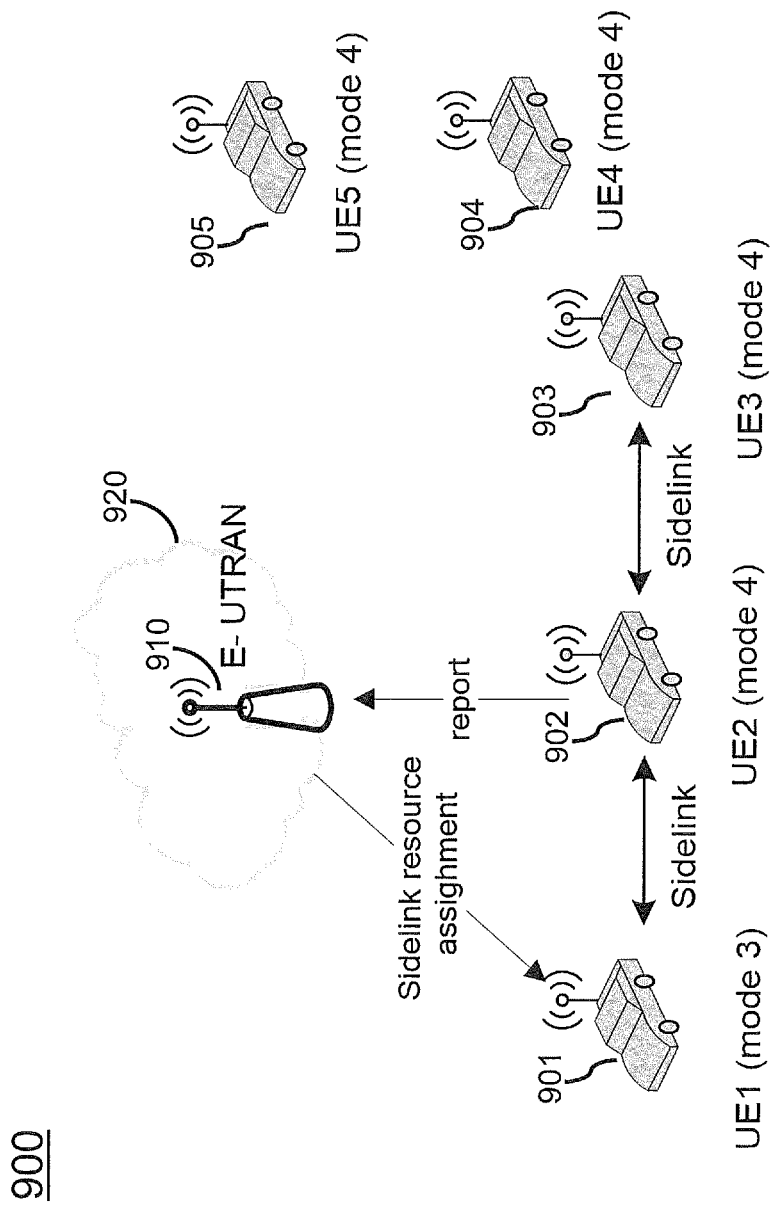
FIG. 9 illustrates another exemplary method for sharing a resource pool in wireless sidelink communications, in accordance with some embodiments of the present disclosure.

In a second embodiment, a mode 4 UE reports the available or unavailable resource information in the shared resource pool for the BS to schedule mode 3 UE. Optionally, the mode 4 UE may perform sensing and reporting of the shared resource pool based on the BS configuration. For example, as shown in FIG. 9, the available or unavailable resource information in the shared resource pool is reported by UE2 902 (mode 4) for the purpose of scheduling of UE1 901 (mode 3) by the eNB 910.

The information related to the shared resource pool reported by a R15 mode 4 UE may contain occupied/unavailable resource information, that is, the occupied/unavailable resource information list, and/or the time domain range information. The occupied/unavailable resource information may include at least one of: carrier frequency information, priority information, frequency domain indication information, frequency resource location of initial transmission and/or retransmission, time gap between initial transmission and retransmission, modulation and coding scheme, time resource location information of initial transmission/retransmission, sub-channel information, RB information, reservation period. The sub-channel information and/or RB information include at least one of the following: Start RB index, start subchannel index, sub-channel number, RB index, subchannel index, a RB bitmap and a subchannel bitmap.

Alternatively, the information related to the shared resource pool reported by the R15 mode 4 UE may contain available resource information, which may include available resource information list, and/or time domain range information. The available resource information may include carrier frequency information, frequency domain indication information, time resource location information, sub-channel information, RB information, reservation period. The sub-channel information and/or RB information can be in the form of index or bitmap.

The time resource location information may include sub-frame indication or subframe offset, which is used to indicate the position of the subframe, where the available/unavailable resource is located, at the SFN cycle, which may be an offset relative to SFN0, subframe 0, or be an offset relative to the reported subframe.

The time domain range information is used to indicate a time domain range of available/unavailable resources reported by the UE. Specifically, the time domain range information may include T1 and/or T2 values for determining the time domain range {n+T1, n+T2} of the available/unavailable resources reported by the UE, where n is the subframe in which the UE performed reporting or the eNB received the report from the UE or subframe #0 of SFN #0. As an example, the T2 value can be equal to the reporting period value T. The T1 and/or T2 value may be configured by the base station or by default, or determined by the reporting UE and reported to the base station. The report may be transmitted periodically and/or triggered by an event.

Figure 10:
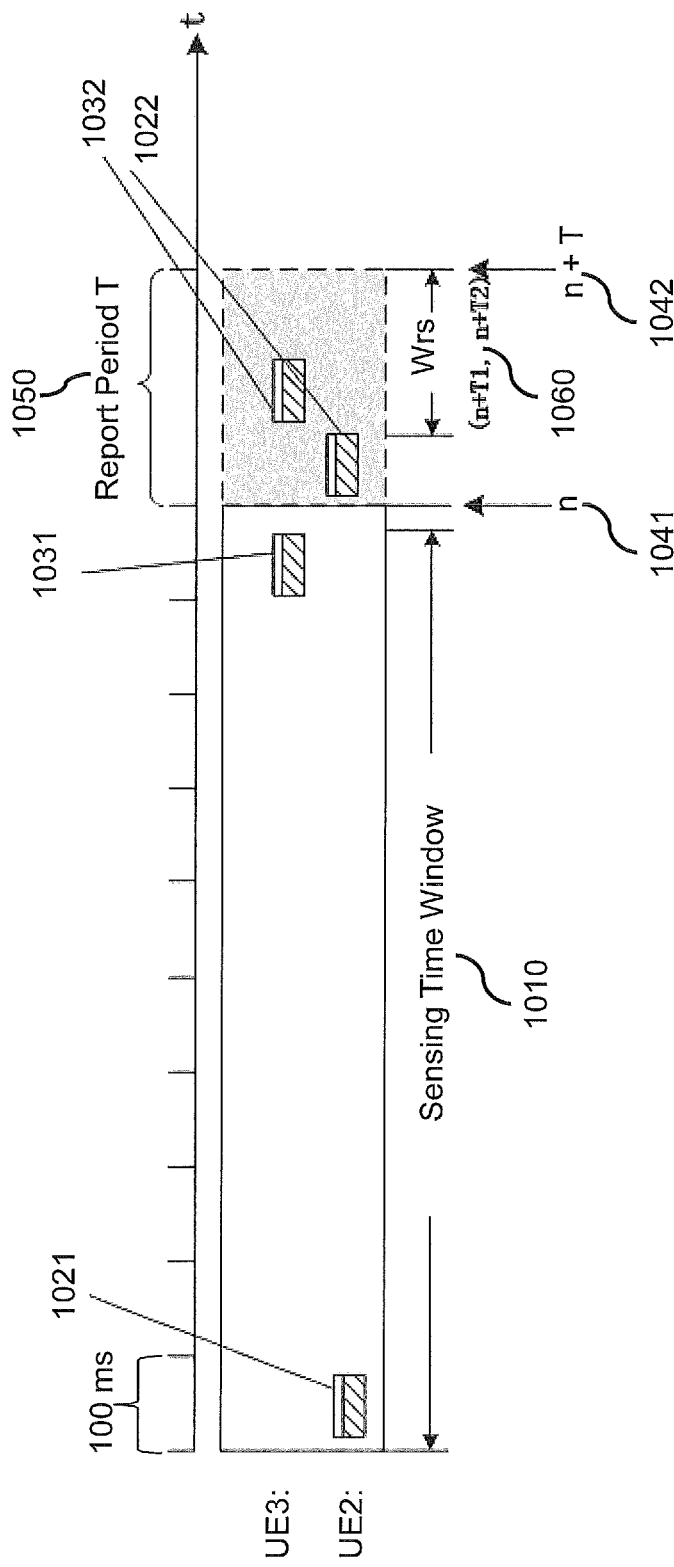
FIG. 10 illustrates an exemplary resource allocation for sidelink communications, in accordance with some embodiments of the present disclosure.

FIG. 10 illustrates an exemplary resource allocation for sidelink communications, in accordance with some embodiments of the present disclosure. As shown in FIG. 10, a reporting UE senses on the shared resource pool within the sensing time window 1010. Based on the sensing, the report UE can obtain the reservation period for each mode 4 UE that selects or reselects resources in the shared resource pool. For example, in FIG. 10, the reporting UE can obtain that UE2 has a reservation period of 1000 ms and UE3 has a reservation period of 200 ms. That is, the reporting UE predicts that UE2 will reserve a resource block every 1000 ms, at both timing point 1021 and 1022; and that UE3 will reserve a resource block every 200 ms, at both timing point 1031 and 1032. The reporting UE may report periodically for every T time period 1050. That is, the reporting UE can transmit a report to BS at time n. 1041, and then transmit another report to the BS at time n+T 1042. The report at time n 1041 will include available or unavailable resource information in the resource pool which locates in a resource selection window Wrs 1060, which is from n+T1 to n+T2. As an example, T2 may be equal to or less than T. In the example shown in FIG. 10, T2 equals T, and the reported resources does not include the information of resources locates from n to n+T1. This is because the BS will need time to decode the report and determine resource allocation and scheduling for mode 3 UE. By the time for the BS to schedule sidelink communication resources, it may already be within the resource selection window Wrs 1060. The BS can schedule some sidelink communication resource within the resource selection window Wrs 1060 to a mode 3 UE, without causing conflict to resource(s) reserved by any mode 4 UE within the resource selection window Wrs 1060.

Figure 11:
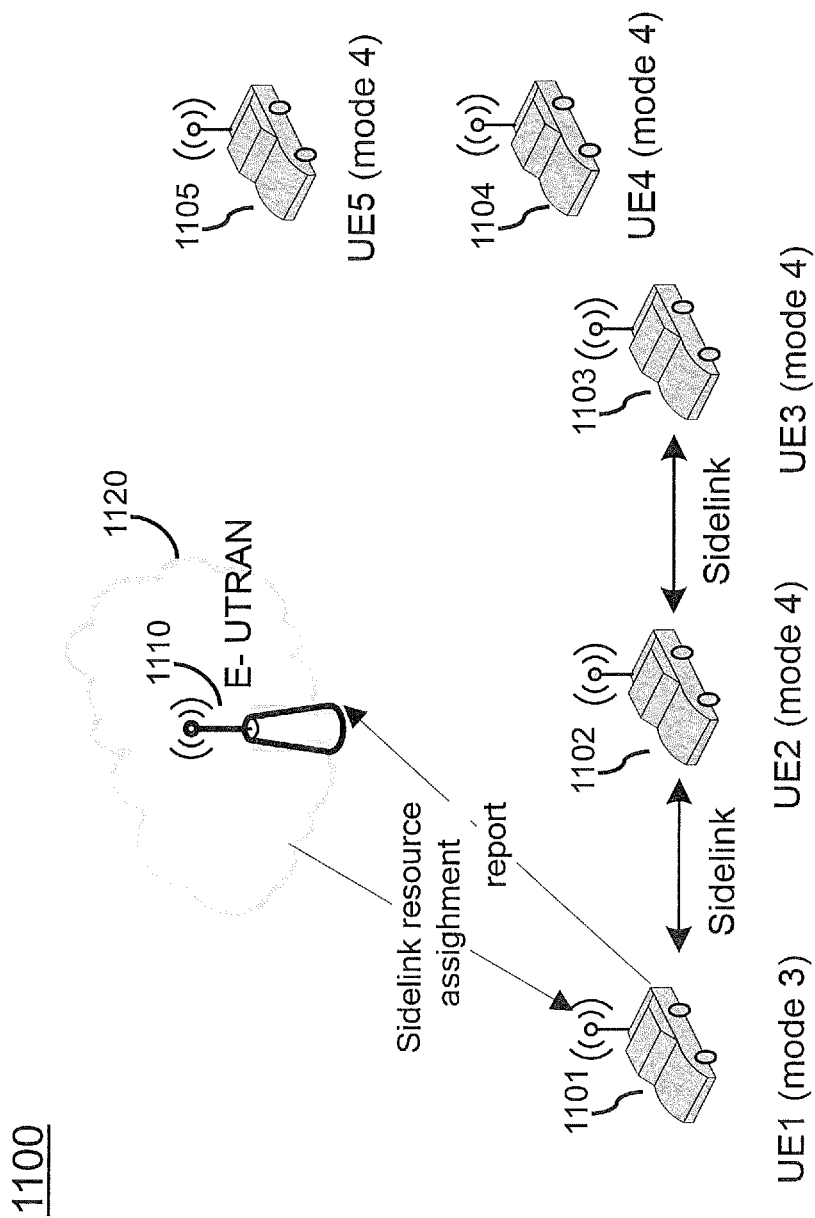
FIG. 11 illustrates another exemplary method for sharing a resource pool in wireless sidelink communications, in accordance with some embodiments of the present disclosure.

In a third embodiment, a mode 3 UE reports the available or unavailable resource information in the shared resource pool for the BS to schedule resource for the mode 3 UE and/or other mode 3 UEs. Optionally, the mode 3 UE may perform sensing and reporting of the shared resource pool based on the BS configuration. For example, as shown in FIG. 11, the available or unavailable resource information in the shared resource pool is reported by UE1 1101 (mode 3) for the purpose of scheduling of UE1 1101 by the eNB 1110.

The information related to the shared resource pool reported by a R15 mode 3 UE may contain occupied/unavailable resource information, that is, the occupied/unavailable resource information list, and/or the time domain range information. The occupied/unavailable resource information may include: carrier frequency information, priority information, frequency domain indication information, frequency resource location of initial transmission and retransmission, time gap between initial transmission and retransmission, modulation and coding scheme, time resource location information of initial transmission/retransmission, sub-channel information, RB information, reservation period. The sub-channel information and/or RB information include at least one of the following: Start RB index, start subchannel index, subchannel number, RB index, subchannel index, a RB bitmap and a subchannel bitmap.

Alternatively, the information related to the shared resource pool reported by the R15 mode 3 UE may contain available resource information, which may include available resource information list, and/or time domain range information. The available resource information may include carrier frequency information, frequency domain indication information, time resource location information, sub-channel information, RB information, reservation period. The sub-channel information and/or RB information can be in the form of index or bitmap.

The time resource location information may include subframe indication or subframe offset, which is used to indicate the position of the subframe, where the available/unavailable resource is located, at the SFN cycle, which may be an offset relative to SFN0, subframe 0, or be an offset relative to the reported subframe.

The time domain range information is used to indicate a time domain range of available/unavailable resources reported by the UE. Specifically, the time domain range information may include T1 and/or T2 values for determining the time domain range {n+T1, n+T2} of the available/unavailable resources reported by the UE, where n is the subframe in which the UE performed reporting or the eNB received the report from the UE or subframe #0 of SFN #0. As an example, the T2 value can be equal to the reporting period value T. Specifically, for example, in the third embodiment, if the mode 3 UE triggers a report after initial data arrival, the mode 3 UE reports the shared resource pool information for its own eV2X data transmission.

The T2 value can be determined by the mode 3 UE according to its own traffic latency requirement, and then reported to the base station. This happens when a mode 3 UE reports the available/unavailable resource information in the shared resource pool for the BS to schedule sidelink communication resource for the mode 3 UE. For example, referring to FIG. 10, when the mode 3 UE reports at n 1041, the T2 value shall not be longer than a traffic latency requirement, e.g. a transmission latency requirement of the traffic of the mode 3 UE. For example, if the traffic latency requirement is 100 ms, the mode 3 UE needs to obtain resource to perform sidelink transmission within 100 ms starting from the time of data arrival. This means the mode 3 UE needs the BS to schedule sidelink communication resource within the time window range {n+T1, n+100 ms}. Therefore, if T2 is larger than 100 ms, there is a risk that the BS will schedule a sidelink communication resource for the mode 3 UE after the timing point n+100 ms, and make the mode 3 UE not meeting the traffic latency requirement.

As another example, if the mode 3 UE performs proactive sensing and reporting periodically, the mode 3 UE cannot determine the T2 value according to the business delay requirement. The T2 value can be configured by the BS or determined based on a default value.

The report may be transmitted periodically and/or triggered by an event. The trigger condition may be when mode 3 UE has data to send. In one embodiment, the report is sent after UE receiving the base station measurement report configuration.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first node, the method comprising:
    sensing on a resource pool shared by a group of nodes for sidelink communications;
    autonomously selecting or reselecting resources to be used in sidelink communications of the first node based on the sensing;
    transmitting a report related to the shared resource pool to a second node, wherein the second node is outside the group of nodes and schedules sidelink communication resources for at least one node of the group of nodes based on the report,
    wherein the report includes information about: every available resource in the shared resource pool and time domain information for the reported resource, wherein the report is triggered by an event associated with a sidelink communication resouce reselection performed by the first node; and
    receiving configuration information from the second node, wherein the configuration information includes resource pool configuration information, wherein the resource pool configuration information comprises whether the resource pool can be used by nodes in radio resource control (RRC) IDLE mode.

2. The method of claim 1, wherein the configuration information further includes report configuration information.

3. The method of claim 1, wherein:
    the resource pool configuration information includes at least one of:
        one or more node types that can use the resource pool,
        whether the resource pool can be used by nodes in RRC CONNECTED mode,
        whether the resource pool can be used by nodes using dynamic scheduling scheme,
        whether the resource pool can be used by nodes using semi-persistent scheduling (SPS) scheme,
        whether the resource pool is a shared resource pool, and
        which release version of nodes can use the resource pool; and
    the report configuration information includes at least one of:
        report indication for indicating one or more nodes requested to report information related to the shared resource pool,
        report indication for indicating one or more nodes allowed to report information related to the shared resource pool,
        one or more node types that are requested to report information related to the shared resource pool,
        one or more node types that are allowed to report information related to the shared resource pool,
        a period of the report,
        time domain information of resources in the shared resource pool that need to be reported, and
        information type to be included in the report.

4. The method of claim 1, wherein:
    the report is transmitted via RRC dedicated signaling which includes at least one of: assistance information of a UE (user equipment), sidelink UE information of a UE, and a measurement report message;
    the report is transmitted via media access control (MAC) control element (CE); or
    the report is transmitted periodically.

5. The method of claim 1, further comprising:
    selecting or reselecting resources for sidelink communications based on the sensing on the shared resource pool, wherein the report includes information of one or more resources reserved by the first node for at least one of: initial transmission and retransmission.

6. The method of claim 1, wherein:
    the time domain information includes one or both values of T1 and T2 for determining a time domain window, wherein the values of T1 and T2 are determined based on at least one of: pre-definition, a configuration by the second node, and a configuration by the first node.

7. A method performed by a first node, the method comprising:
    receiving a report related to a shared resource pool from a second node, wherein the shared resource pool is shared by a group of nodes for sidelink communications and the first node is outside the group of nodes;
    scheduling sidelink communication resources for at least one node of the group of nodes based on the report, wherein the report includes information about: at least one available or unavailable resource in the shared resource pool and time domain information for the reported resource; and wherein the time domain information includes values of T1 and/or T2 for determining a time domain window {n+T1, n+T2} in which the reported available or unavailable resources locates, where n is a sub-frame on which the report is transmitted, or n is subframe #0 of system frame number (SFN) #0.

8. The method of claim 7, wherein the configuration information further includes report configuration information.

9. The method of claim 8, wherein:
the resource pool configuration information includes at least one of:
  one or more node types that can use the resource pool,
  whether the resource pool can be used by nodes in RRC CONNECTED mode,
  whether the resource pool can be used by nodes using dynamic scheduling scheme,
  whether the resource pool can be used by nodes using semi-persistent scheduling (SPS) scheme,
  whether the resource pool is a shared resource pool, and
  which release version of nodes can use the resource pool; and
the report configuration information includes at least one of:
  report indication for indicating one or more nodes requested to report information related to the shared resource pool,
  report indication for indicating one or more nodes allowed to report information related to the shared resource pool,
  one or more node types that are requested to report information related to the shared resource pool,
  one or more node types that are allowed to report information related to the shared resource pool,
  a period of the report,
  time domain information of resources in the shared resource pool that need to be reported, and
  information type to be included in the report.

10. The method of claim 7, wherein:
the report is received via RRC dedicated signaling which includes at least one of: assistance information of a UE (user equipment), sidelink UE information of a UE, and a measurement report message;
the report is received via media access control (MAC) control element (CE); or
the report is received periodically.

11. The method of claim 7, wherein:
the second node senses on the shared resource pool to select or reselect resources for sidelink communications; and
the report includes information of one or more resources reserved by the second node for at least one of: initial transmission and retransmission.

12. The method of claim 7, wherein:
the time domain information includes one or both values of T1 and T2 for determining a time domain window, wherein the values of T1 and T2 are determined based on at least one of: pre-definition, a configuration by the second node, and a configuration by the first node.

* * * * *